United States Patent [19]

Miyagawa et al.

[11] Patent Number: 4,626,876

[45] Date of Patent: Dec. 2, 1986

[54] SOLID STATE CORONA DISCHARGER

[75] Inventors: Seiichi Miyagawa, Nagareyama; Itsuo Ikeda, Sagamihara; Shigeru Suzuki, Yokohama, all of Japan

[73] Assignee: Ricoh Company, Ltd., Japan

[21] Appl. No.: 695,461

[22] Filed: Jan. 25, 1985

[30] Foreign Application Priority Data

| | | | |
|---|---|---|---|
| Jan. 25, 1984 | [JP] | Japan | 59-010288 |
| Mar. 14, 1984 | [JP] | Japan | 59-047104 |
| Mar. 14, 1984 | [JP] | Japan | 59-047105 |
| Mar. 14, 1984 | [JP] | Japan | 59-047107 |
| Mar. 14, 1984 | [JP] | Japan | 59-047106 |

[51] Int. Cl.[4] .......... G01D 9/00; G01D 15/06; G01D 15/14; H04N 1/23

[52] U.S. Cl. .......... 346/160; 346/159; 346/11; 358/300

[58] Field of Search .......... 346/153.1, 155, 159, 346/160, 1.1; 358/300; 250/324, 325, 326; 355/3 CH; 361/230, 313, 330

[56] References Cited

U.S. PATENT DOCUMENTS

| | | | |
|---|---|---|---|
| 2,297,200 | 9/1942 | Buschbeck et al. | 361/274 |
| 2,648,804 | 8/1953 | Steigerwalt et al. | 361/330 X |
| 3,551,197 | 12/1970 | Lindquist | 361/313 X |
| 3,721,871 | 3/1973 | Heron | 361/330 |
| 4,419,713 | 12/1983 | Levinson | 361/330 X |

*Primary Examiner*—E. A. Goldberg

*Assistant Examiner*—Linda M. Peco

*Attorney, Agent, or Firm*—Guy W. Shoup

[57] ABSTRACT

A solid state corona discharger in corona chargers which charge and discharge photosensitive members in electrophotographic copying machines, ozone generators and the like. The solid state corona discharger has paired strip-shape ac electrodes which are arranged side by side nearly in parallel and spaced away from each other not to initiate discharge, a dielectric member layer which covers at least one side of the external surfaces enveloping both electrodes, and a thin dc-applied electrode which is in contact with one side of external surface of said dielectric layer and makes up a closed circuit loop of capacitances together with said ac electrodes (not connected in terms of direct current), as well as characterized by producing corona discharge between said ac electrodes and a dc-applied electrode with an ac power supply applied across said ac electrodes. In using the solid state corona discharger according to said configuration as a charger for a thin substance to be charged, the substance is charged by placing a dc-applied electrode opposite to the surface of the substance; connecting a dc power source between the dc-applied electrode and the surface to be charged; and generating a dc electric field between the solid state corona discharger and said surface to be charged; as well as by initiating corona discharge between an ac electrode and a dc-applied electrode.

16 Claims, 17 Drawing Figures

SOLID STATE CORONA DISCHARGER

BACKGROUND OF THE INVENTION

This invention relates to a solid state corona discharger for use in corona chargers which charge and discharge photosensitive members in electrophotographic copying machines, ozone generators and the like.

Corona dischargers have been widely used in corona chargers which charge and discharge photosensitive members in recording devices utilizing an electrophotographic process, such as electrophotographic copying machines, facsimiles, laser printers and LED (light emitting diode) printers, and also have been widely used in ozone generators for preserved freshness of foods in a refrigerator, sterization, deodorization or decolorization, and clean-up.

To charge or discharge photosensitive members in copying machines, corotorons or scorotorons have been used so far in which a fine wire of several ten micrometers in diameter. is enclosed with a U-shaped plate electrode. But a fine wire with toner or paper powder attached or with flaw, unevenness or other some infinitesimal defects is likely to cause irregular distribution of charges. In particular, in the case of minus charge when the drawback remarkably manifests itself, improvements are made by a provision of scorotorons equipped with a screen over an opening in said plate electrode, thus resulting in additional drawbacks, such as larger, more complex, and more expensive construction.

With dischargers having said fine wire, the wire is troublesome in cleaning up and maintaining the dischargers. Yet further, industrial copying machines wide in size need a long wire, which may cause vibration, thus introducing additional drawbacks such as irregular charges and burnout due to abnormal spark discharge.

Aiming at depriving these drawbacks of such conventional finewire corona dischargers gave rise to an invention of charging and discharging device known as the solid state charger (hereinafter abbreviated as SSC) wherein firstly an alternating current or pulse-wise voltage generates ions and electrons over a dielectric-member surface and secondly a direct current electric field transfers them on a surface to be charged, some of which are proposed in U.S. Pat. Nos. 3,438,053 and 4,155,093, etc.

The concept of SSC seems to originate in an electrode construction and electrical circuitry means for electrostatic printer heads disclosed in U.S. Pat. No. 3,438,053 (applied for in July, 1964). FIG. 1 is the illustrative drawing of the patent. Paired electrodes 2 and 3 are separated with a dielectric member 1 and exposed to the air. On the paired electrodes a pulse source 6 applies a pulse voltage to produce ions together with electrons. DC power sources 7 and 8 generate a dc field in a space surrounded by the paired electrodes 2 and 3, a control electrode 5, and a surface 4 to be charged (working as an opposite electrode), and the field in turn transfers the ions to the surface 4 to be charged. Because the electrodes 2, 3, and 5 are all exposed to the air, the system is apt to produce abnormal spark discharge due to dust deposit, changes in environmental conditions and other external factors, thus suffering from the failure to build up an electrical field enough to yield a sufficient amount of ions.

To overcome the drawback, a method is used to control the charging and discharging of substances close to a surface layer by means of ions in the silently-discharging corona which is formed on the surface layer by a bank of electrodes in use for application of high ac voltage, arranged inside a dielectric member and on the surface layer.

Another method, disclosed in U.S. Pat. No. 4,155,093, is a combination of the generation and transfer of ions, aiming at utilization for both the electrode head of printers and the charger of copying machines. Contrary to said exposed electrodes, as shown in FIG. 2, this method uses electrodes 2 and 3, which are separated by a dielectric member 1, thereby remarkably increasing stability for spark discharge. Numeral 10 is a section where ions are formed and stored. Numeral 9 is a charging switch. An ac power supply 6 uses a voltage of sine, triangular or rectangular wave. With this method, however, the practical thickness of the dielectric layer 1 between paired electrodes 2 and 3 must be less than 100 micrometers and preferably as thin as less than 50 micrometers for better performance. Accordingly, the presence of initial defects in manufacturing, or foreign matters (dust) or pinholes, or other weak points in terms of voltage withstand ability in the dielectric member causes drawbacks that under high voltage being applied, large fluctuation appears in load capacity, and short-circuit takes place, resulting in operational failure, thus minimizing allowance and reliability. Even though protective resistances and capacitances are previously added to successfully come up with such possible failures, these parts are not only of costly high voltage resistance, but also actual operation of these parts needs larger resistance and smaller capacitance of said additional parts to effectively prevent breakdown damage, thus requiring a considerably higher ac output voltage than that actually required at the ion generating section, resulting in a larger and more expensive power supply.

Contrary to said SSC, a device as shown in FIG. 3 is known in which paired electrodes 2 and 3 entirely set in a dielectric member 1. But a dc electric field will affect the surface layer of the dielectric member 1 to be filled with reversed-polarity ions to the charged polarity ions, which may fail in desirable charging, thus resulting in a poor actual charge efficiency.

SUMMARY OF THE INVENTION

It can be said that the purpose and object of this invention is to provide a solid state corona discharger which eliminates drawbacks of the prior art shown in FIG. 2, such as said loss of manufacturing allowance due to dielectric breakdown caused by sparks, and short life due to deteriorated voltage withstand ability resulting from operation.

To achieve aforesaid purpose, a solid state corona discharger according to the invention is characterized by having paired thin strip-shape ac electrodes which are arranged side by side nearly in parallel to each other, and spaced away from each other not to initiate discharge, a dielectric layer which covers at least one side of the external surfaces enveloping both electrodes, and a thin dc-applied electrode which is in contact with one side of external surface of said dielectric layer and makes up a closed circuit loop of capacitances together with said ac electrodes (not connected in terms of direct current), as well as characterized by producing corona discharge between said ac electrodes and a dc-applied electrode with an ac power supply applied across said ac electrodes.

This configuration disables a dielectric member in a solid state corona discharger to have energy ($\frac{1}{2}CV^2$) so strong as to cause burnout and breakdown, thus permitting the dielectric member not only to achieve long life and high reliability, but also to provide for an adequate allowance in manufacturing and a reduction in cost.

In using a solid state corona discharger according to said configuration as a charger for a thin surface to be charged, the surface is charged by; placing a dc-applied electrode opposite to the surface; connecting a dc power source between the dc-applied electrode and the surface to be charged; and generating a dc electric field between the solid state corona discharger and said surface to be charged; as well as by initiating corona discharge between an ac electrode and a dc-applied electrode.

The solid state corona discharger according to said configuration provides for an extremely thin and reliable charger which contributes to a smaller charger and discharger of photosensitive members in electrophotographic copying machines and other electrostatic recorders.

Other objects, features and advantages of the invention will become apparent from the following description, taken in conjunction with the accompanying drawings.

DETAILED DESCRIPTION OF THE PREFERRED EMBODIMENTS

Figure 4:
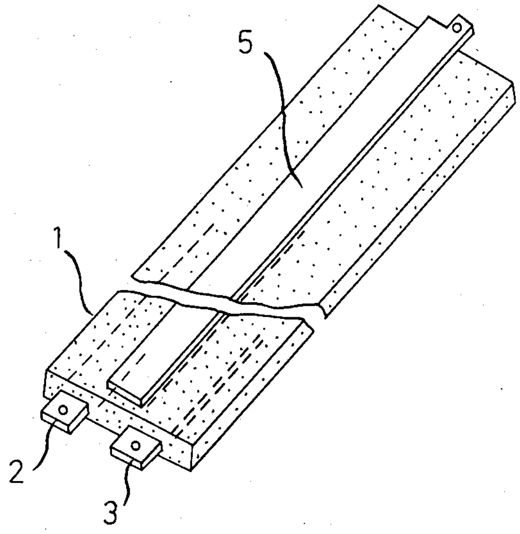
FIG. 4 is a perspective view of an embodiment according to the invention.
Figure 5:
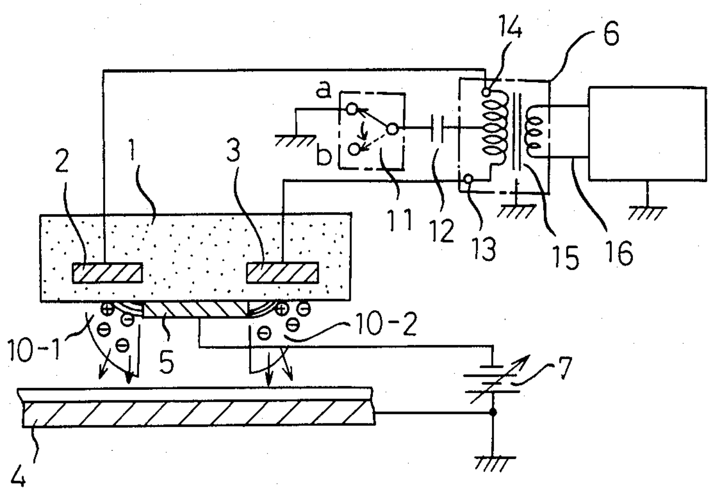
FIG. 5 is a schematic sectional view of the embodiment in FIG. 3 combined with a substance to be charged.

Referring now in detail to the illustrative embodiments according to the invention:

FIG. 4 shows an embodiment wherein a system according to the invention is used for a charger for a surface to be charged. FIG. 5 is the sectional view of the embodiment. Contrary to the prior art, the first electrode 2 and second electrode 3 both for ion generation along with the secondary side (output side) of the power source (ac current or high voltage pulse) 6 are floating (not tied) to each other on a dc basis and the third electrode 5 for dc application is connected to the paired electrodes 2 and 3 as capacitance to form a closed circuit loop of capacitances with the paired ac electrodes 2 and 3. In other words, the surfaces of the first electrode 2 and the second electrode 3 are coated with a certain thickness of a dielectric 1, and one side surface of the third electrode 5 is placed in surface contact with the surface of the dielectric 1. A dc power source 7 is installed between the other surface of the third electrode 5 and a substance to be charged 4 (an electrode) placed opposedly to the third electrode.

To explain the operation of the system according to the invention in reference to FIG. 5, a changeover switch 11 is thought to be installed in the system through a small-capacity condenser 12 to a center tap on the secondary side of an ac power transformer 6. When the switch is switched to "b" side (floated circuit), only either an ion generating air gap 10-1 or 10-2 will discharge between both of the first and second electrodes 2, and 3, and the third electrode 5. This happens due to capacity unbalance between terminals 13 and 14, resulting from excessive capcities of coil and core. High efficiency cannot be obtained without making use of the ion generating air gaps 10-1 and 10-2 on both sides.

Figure 1:
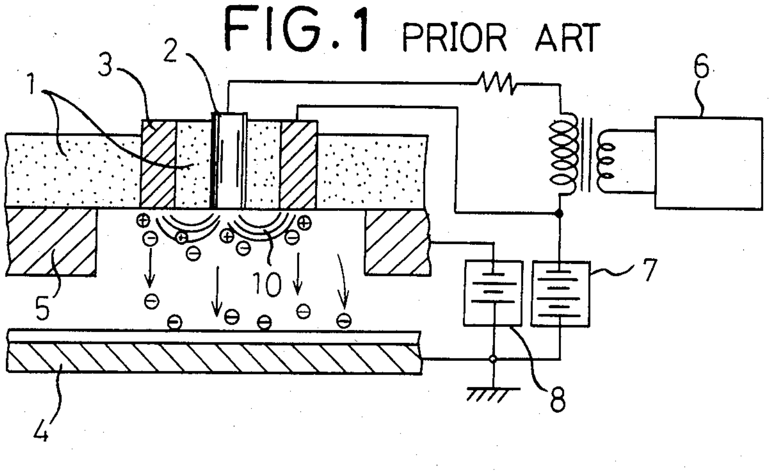
FIG. 1 PRIOR ART
FIGS. 1 to 3 are schematic and sectional drawings showing the prior art.
Figure 2:
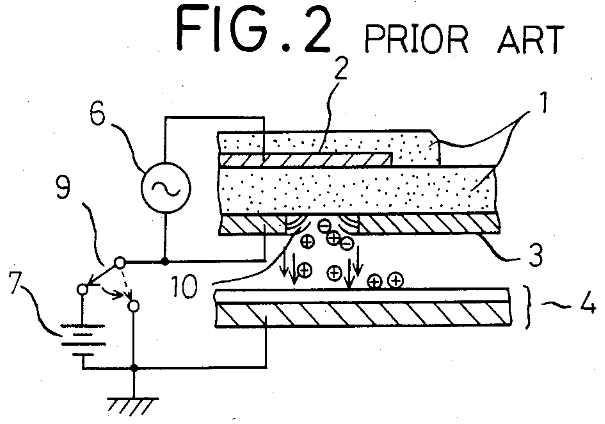
FIG. 2 PRIOR ART

When said capacitites are smaller and the windings of the transformer 6 are balanced between both terminals, corona light emission appears in both air gaps, independent of the dc circuit condition (ON or OFF) for the third electrode 5. If there is an unbalance, throwing the switch to "a" side will achieve corona generation in both air gaps. When the electrode 5 in the vicinity of the ion generating air gaps is light emitting at a high alternating voltage with a very small capacity load, intentional blowing of dust and an extremely long period of operation would cause less sparks or damage, in comparison to the prior art of FIG. 2. Surprisingly, the SSC in the system according to the invention has proved to maintain corona discharge without fail, while the same SSC in the system according to the prior art of FIG. 2 has failed due to pinhole burnout, as well as proved to show better charging characteristics than those for the prior art, when comparing both systems with the same order of discharge emitting light length. This seems to indicate that, since the ac ion generating circuit is divided into two or more capacitances, slight pinholes allow the floating electrode 5 to settle at an adequate potential, thereby minimizing load fluctuations.

Figure 6:
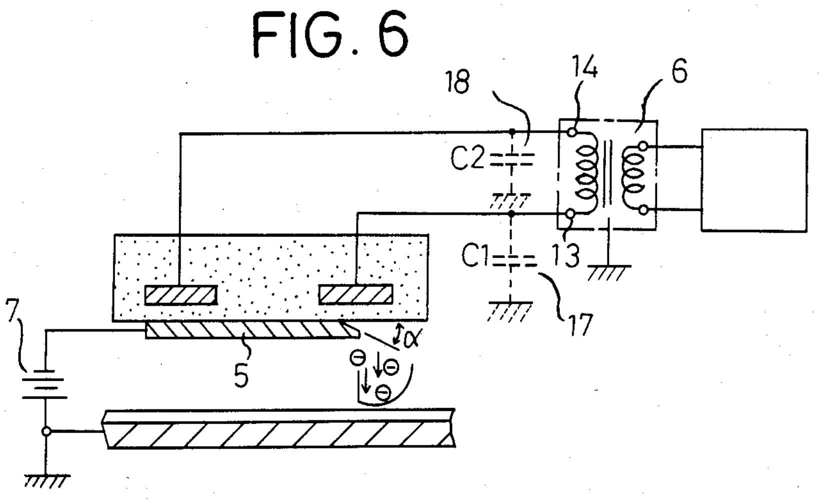
FIG. 6 is a schematic sectional view of another embodiment according to the invention.

Setting of the sectional geometry of the third electrode (as shown in FIG. 6) so that a contact angle of the edge face (discharge initiating face) of the third electrode 5 with the surface of the dielectric 1 at the connecting portion is less than 90 degrees on the space side, facilitates ion generation and corona discharge, thus preventing uneven discharge.

Figure 7:
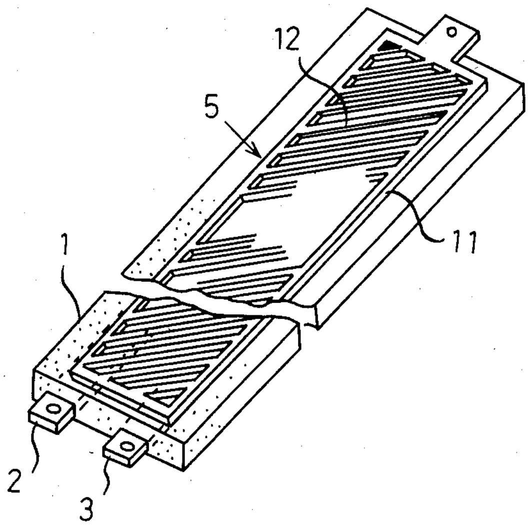
FIG. 7 is a perspective view of an embodiment according to the invention wherein a mesh is used for a dc-applied electrode.

Forming the third electrode 5 into a mesh made of nickel or other conductors as shown in FIG. 7, or placing lengthwise two or more strips of conductors in parallel enables all the filamentlike side surfaces of the mesh or strips to contribute to the discharge initiating surface area, thus extending ion generating portions to the nearly whole area of the third electrode, thereby creating a great amount of ozones and ions.

When using polyimide as dielectric whose dielectric constant is nearly 3, the polyimide less than 50 micrometers in thickness between the paired electrodes for application of an ac high voltage and the electrode for generation of ions around it can obtain relatively sufficient electric charge even with the voltage conventionally available.

Figure 8:
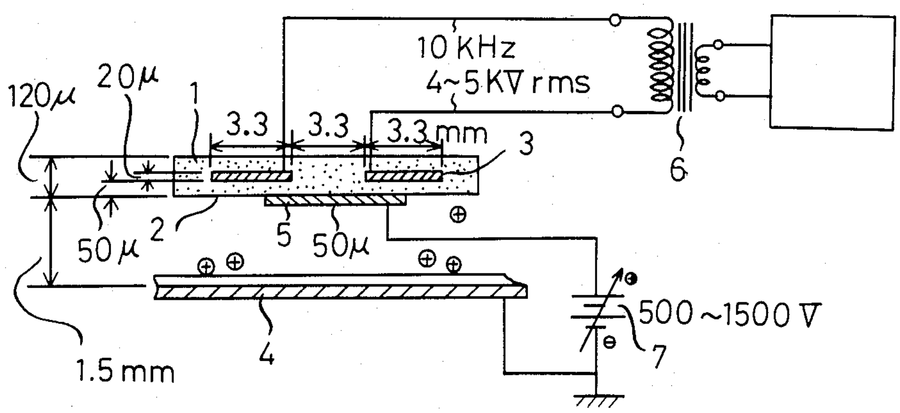
FIG. 8 is a schematic illustration exemplifying a size of each embodiment whose sectional view is shown respectively in FIGS. 5 and 6.

An example involving a preferred configuration and dimension for the embodiments according to the invention whose sections are illustrated in FIGS. 5 and 6 is shown in FIG. 8. A dielectric member 1 is so constructed that the first electrode 2 and the second electrode 3, each made of copper thin plate 20 micrometers in thickness are sandwiched between two 50 micrometer thick polyimide films, thus adding up to 120 micrometers in total. Each length of the first and second electrodes and the spacing between them are respectively 3.3 mm. The third electrode 5 is also made of copper thin plate 50 micrometers in thickness. The surface of the dielectric member 1 and the surface of an electrode 4 of Mylar film (trade name of polyethylene glycol terephthalate film :Du Pont) to be charged are spaced out nearly 1.5 mm. As discussed later, an additional coating of thin ceramic layer is desirable on the surface of the dielectric member 1 on which the dc-applied electrode 5 is placed.

Ranges of ac and dc voltages and other characteristics are also shown in the drawing. The corona(ion generating) electrode is floating (not tied) to ac paired electrodes on a dc basis according to the effects of the invention. The alternating current frequency and voltage applied between the first electrode 2 and the second electrode 3 is 10 KHz and 4 to 5 KVrms, and a high voltage pulse transformer is used as power supply. The dc power source applied between the third electrode 5 and the substance to be charged 4 is designed to range 500 to 1500 V. When charging a sheet of Mylar film (substance to be electrified) at a relative rate of approximately 300 mm/sec, charged potentials of several hundred volts were obtained for nearly practical use as well as with uniform distribution. A variable dc power supply provides for the regulation of charged potential.

When charging or discharging a substance to be charged using a solid state corona discharger according to said configuration, a shorter distance between a dc-applied electrode and a photosensitive member in a solid state corona discharger will require a lower dc voltage. On the other hand, the smallest possible diameter of a photosensitive drum in use for copying machines, etc. is desirable in view of smaller size of machines. In order to obtain a uniform and smaller spacing between a photosensitive drum with such small diameters as for copying machines and a surface of a solid state corona discharger, the best possible geometry of the surface opposing to the photosensitive drum in a solid state corona discharger may be a circular section concentric with the photosensitive drum. A dielectric layer having such a circular-sectional surface an easily made from flexible resin. However, a dielectric in a solid state corona discharger is continually exposed to plasma in the air, in which the ozones and ions generated will work against molecular-linkage chains of synthetic resin (forming the dielectric) into their breakage, resulting in the brittleness of the material, as well as the high field causes local breakdown around pores and other structural defects in the material, thus accelerating deterioration.

For instance, observations on the broken portion of 50 micrometer thick polyimide under a long period of test applied with 3-KHz, 4-KVrms voltage have proved that the surface first discolored, resulting in the eventual degradation of the material starting from the surface.

A ceramic dielectric layer can stand plasma in the air and a high ac field, thus resisting deterioration and enhancing durability. But lengthy curved ceramics cannot be actually available because high temperatures of 1,500 to 2,000 degree C. which they are subjected to in sintering cause ceramics to break due to high thermal stress resulting from lengthy curvature. And also being brittle in nature, ceramics are likely to crack or break in manufacturing and in replacing during maintenance.

In order to overcome said drawbacks associated with lengthy curved ceramics, the invention employs a newly developed technique as follows: The base material of a dielectric member according to the invention is made of flexible resin, on whose surface a coating of ceramics is made, at least where the air full of ozones and ions is in contact with, that is, a dc-applied electrode is placed. This resolves challenges, and allows not only flat, but also lengthy curved dielectric members to be manufactured, which are resistant to shocks and less subject to deterioration due to ozones and ions even if exposed to the plasma in the air.

EXAMPLES

The foregoing description illustrates the general principles and features of the invention. The following specific and nonlimiting examples illustrate specific applications of the invention.

EXAMPLE I

Figure 9:
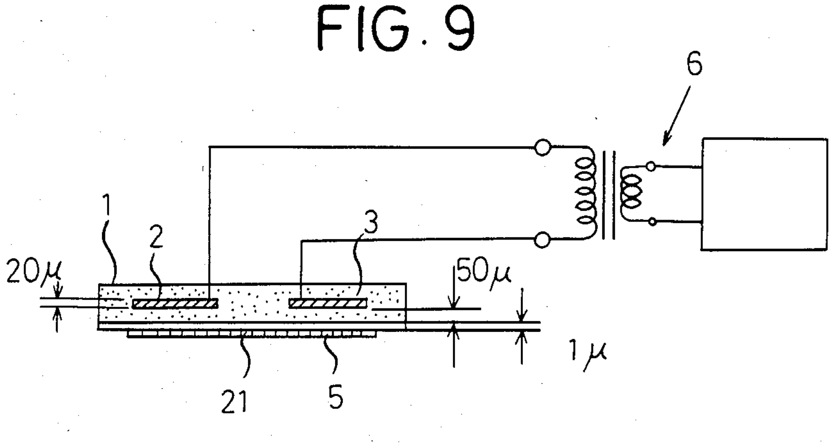
FIGS. 9 and 13 sectional views showing respectively other embodiments according to the invention.

As shown in FIG. 9, an embodiment of a solid state corona discharger according to the invention is made as follows; ac electrodes 2 and 3 each are made of a copper sheet of 20 micrometers in thickness; a dielectric layer 1 is so constructed that 50-micrometer polyimide films sandwich the either side of both electrodes, and the both sides of the films are directly connected to each other where there are no electrodes; a thin ceramic layer 21 of about 1 micrometer in thickness is spattered on the surface where a dc-applied electrode 5 is placed; nickelbased meshes are installed on the ceramic layer to form the dcapplied electrode 5. Time which it takes for the dielectric layer 1 to eventually show degradation is measured on the condition that an ac power supply is connected across the ac electrodes 2 and 3 to apply a high ac field, thereby generating corona discharge.

As the result with the example of the embodiment wherein a thin ceramic layer is spattered on the surface of the dielectric member exposed to the plasma in the air, it is found that the life extends several times, as compared to that of the prior art without any ceramic layer.

In general, ceramics need high temperature sintering treatment at 1,500 to 2,000 degrees C., while polyimide made from synthetic resin cannot stand such high temperatures. Therefore, SiOx (silicon oxide), $Si_3N_4$ (silicon nitride), TaN (tantal nitride) or other ceramics is spattered as a bombardment target on the surface layer of the polyimide.

Since the dispensing rate of hot ceramics is constant, the thickness of ceramics deposited on is controlled by changing their spattering time and also care is taken not to have extremely high temperatures of polyimide, by stopping dispensing sometimes for cooling. The order of only one micrometer thickness is sufficiently effective for a ceramic layer, because the layer is overlayed only to separate the resin layer from the air including ozones and ions, thus avoiding their direct bombardment to polyimide. The very thin thickness of ceramics layer is useful in preventing the layer from cracking or breaking.

EXAMPLE 2

Figure 10:
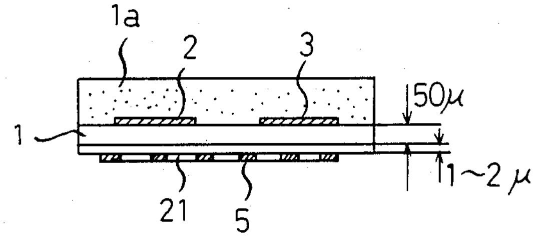

In another embodiment of a solid state corona discharger according to the invention, polycarbonate or polyamide-imide having relatively high softening point is used for an organic insulating compound forming a dielectric layer 1. As shown in FIG. 10, on one side surface of 50 micrometer thick dielectric film 1 of said material, ac electrodes 2 and 3 each are printhardened with silver paste or other conductive paint, and on the same side surface, where the electrodes 2 and 3 is not present, a spark discharge barrier (layer) 1*a* is formed by coating quick-hardenable epoxy adhesive with the surface roughly finished. Then on the other side surface of the dielectric film 1 opposite to said electrodes 2 and 3 as well as the spark discharge barrier 1*a*, a one to two micrometer thin $Al_2O_3$ layer 21 is formed by a chemical vapor deposition process explained more specifically as follows;

Alluminum alloy in a vaporization tank as deposition agent:

Vacuum conditions, a total pressure of $10^{-5}$ to $10^{-2}$ Torr and an Oxygen partial pressure of $10^{31\ 5}$ to $10^{-2}$ Torr: and Depositing rate of 0.005 to 500 Å/sec with said resin surface as a base plate.

The nature of alluminum alloy, i.e. vaporization at lower boiling point than $Al_2O_3$, easier maintenance of base plate at a room temperature and formation of thicker film in short time, is desirable for forming a composite dielectric layer in use for a solid state corona discharger.

Then on the $Al_2O_3$ film a mesh-like electrode 5 is printed with conductive silver paste and hardened in an 80° C. atmosphere for about 30 minutes.

Alternatively the thin ceramics layer can be made by coating vitreous glaze other than the method explained in said embodiment.

Formation of the ceramics layers of the same thickness on both sides of the dielectric base metal rather than one side permits thermal expansion of two ceramics layers sandwiching the resin dielectic base metal to balance thermal stresses regardless of the difference of expansion coefficients between ceramics and resin, thus eliminating possible distortion associated with oneside coating. Less roughness of the surface of ceramics layer proved to be effective in preventing deterioration due to ozone and ion attack.

In addition to polyimide and polyamide-imide, epoxy resin is also suitable for base material for dielectric layer.

Said method provides a long-life solid state corona discharger which resists shocks and eliminates deterioration from being exposed to plasma in the air as well as has a lengthy curved surface, thereby contributing to the improvement of charging efficiency.

When placing particular stress on durability, ceramics is the best material for dielectric. But as previously stated, since they are sintered at high temperatures, a lengthy thin layer of ceramics having a curved surface causes breakage due to internal thermal stresses, thus being hard to manufacture. Nevertheless, in dealing with a plane having parallel surfaces on both sides, negligible internal stresses arising from heating allow for the manufacturing of a lengthy dielectric member made of ceramics.

Accordingly, splitting a solid state corona discharger into slim sections permits a rectangular section of ceramics to be used, while reduced width allows for shorter spacing along a photosensitive member between the surface of photosensitive member and the splitted surfaces of the solid state corona discharger.

Figure 11:
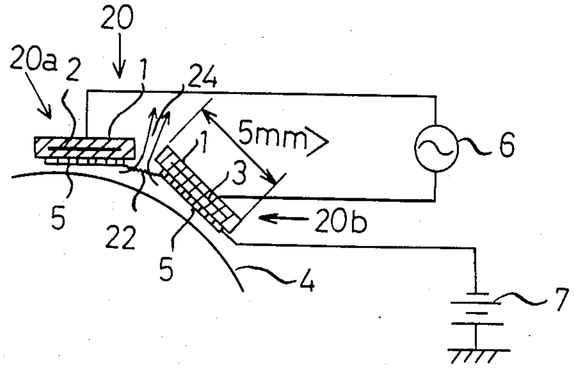

FIG. 11 is a sectional view of the embodiment according to the invention. A solid state corona discharger is divided into two longitudinally slender pieces 20*a* and 20*b*, each having a dielectric 1 enclosing respectively an ac electrode 2 and 3 along with a mesh-like dc-applied electrode 5 placed on the dielectric. Here it is nothing to say that the two dc-applied electrodes are not made from one piece of electrode by splitting longitudinally the electrode of the shape shown in FIG. 7, but that they are respectively a self-contained electrode which has two longitudinal filaments and parallel filaments diagonally placed between the two filaments. The two dc-applied electrodes 5 are connected with a lead wire 22, and further to a dc power source 7. An ac power supply is connected between the ac electrodes 2 and 3.

Therefore, this solid state corona discharger is all the same in terms of electrical circuitry and functions as that shown in FIG. 5, which can charge a photosensitive member and yet keep spacing in a range as required between the splitted surfaces of the solid state corona discharger and the surface of the photosensitive member.

In addition, in the embodiment shown in FIG. 11, the solid state corona discharger is divided into two sections, but may be divided into four or more.

As described above, splitting width-wise a solid state corona discharger into slender pieces allows spacing between the surfaces of the photosensitive member and solid state corona discharger to be limited within a preferable range, thereby allowing the dielectric to be made from ceramics for enhanced durability as well as permitting the diameter of the photosensitive drum to be reduced for a smaller discharger.

It is known that if the space between an ion initiating portion and a material to be charged is filled with ions and ozones, the material is hard to charge, thus resulting in locally irregular amounts of charging. Conventional corotorons and scorotorons using filaments cut openings in an electrode plate surrounding filaments to flow winds or move the air in contact with a photosensitive member to be charged, thereby preventing ions and ozones to stagnate and become full. With solid state corona dischargers, however, since the narrow space between the discharging surface and the photosensitive member to be charged checks ventilation, there are great possibilities that ions and ozones stagnate and become full in the space in contact with the member to be charged, and in particular during a long period of operation poor or irregular charging may occur.

To solve this difficulty, a provision of ventilation holes penetrating through dielectric members helps ventilate the space between the surface of a photosensitive member to be charged and the surfaces of a solid state corona discharger opposite to the material surface, thereby preventing ions and ozones from becoming full.

Figure 12:
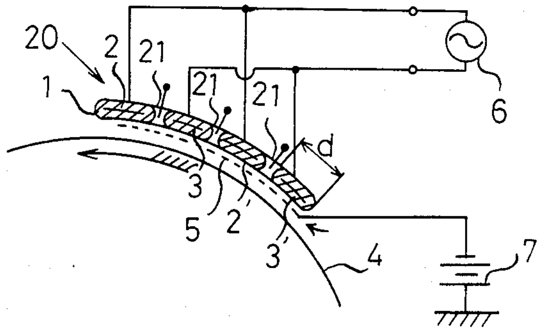

An embodiment of this configuration is shown in FIG. 12.

Inside a dielectric layer 1 in a solid state corona discharger 20 according to this embodiment, ac electrodes 2, 3, 2' and 3' are placed side by side at proper intervals in this order. The ac electrodes 2 and 2' as well as 3 and 3' are connected respectively in parallel to the terminals of an ac power source 6. On the surface of the dielectric layer 1 facing a photosensitive drum 4, a mesh-like dc-applied electrode 5 as shown in FIG. 7 is covered over the nearly whole surface, and connected to a dc power source 7. Through the dielectric 1 between the four ac electrodes 2, 3, 2' and 3', a proper number of through holes 21 is opened from the surface facing the photosensitive drum to the opposite surface. A provision of said through holes, spaced transversially at intervals d of less than approximately 5 mm in the solid state corona discharger 20, provides good ventilation for the space between the solid state corona discharger 20 and the photosensitive drum 4, thereby preventing ions and ozones from becoming full, resulting in good electrification.

As previously illustrated in FIG. 11, with the configuration of a solid state corona discharger 20 which is splitted transversially into two strips 20*a* and 20*b*, the clearance between the two strips 20*a* and 20*b*, which are respectively less than 5 mm in width and properly spaced to each other, acts as a through hole, which helps ventilate properly the space between the two strips 20*a* and 20*b*, and the photosensitive drum 4.

Figure 13:
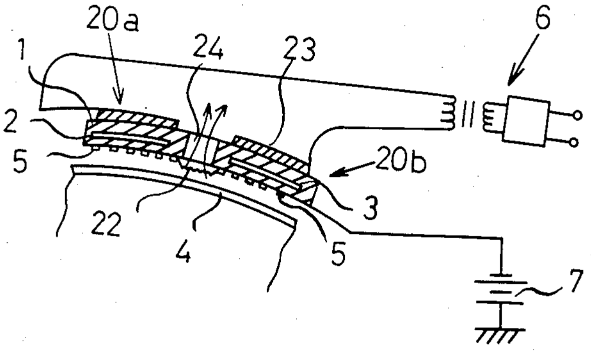

For the discharger illustrated in FIG. 11, as shown in FIG. 13, installation of heating elements 23 on the surface of the solid state corona discharger 20 opposite to the photosensitive drum 4 causes convection due to heated air over the outside surface of the solid state corona discharger 20 to draw in the air between the solid state corona discharger 20 and the photosensitive drum 4 through a ventilation slit formed by the clearance 24 between the two strips 20*a* and 20*b*, thus improving ventilation, developing an additional effect on the prevention of poor electrification due to ions and ozones filled up.

Alternatively rather than heating elements on the external surface of a solid state corona discharger 20, a blower may be installed to draw in the air from the clearance between the strips 20*a* and 20*b*.

The provision of said heating elements or a blower is not be limited to the solid state corona discharger which is splitted into smaller pieces for ventilation clearances, but also may be applied to a one-piece type of discharger wherein a number of ventilation through holes are opened as shown in FIG. 12.

Now, copying machines are generally so designed that several sizes of copies can be reproduced respectively by selecting a switching position. When the width of an imaging range on a photosensitive member is shorter than the whole width of a photosensitive drum, and the whole width of the photosensitive member is charged by a charger, the charge for the outside remaining portion other than the imaging range must be erased, thus resulting in consumption of extra power by that amount of erasing. In particular with reduced copying, if the portion other than the imaging range should not be erased, the portion is developed in solid black, thus resulting in not only useless consumption of toner but also an increase in cleaner load.

Therefore, it would be convenient if the charging range of a charger could be ajdusted to a variety of imaging ranges on photosensitive members. Aiming at a solid state corona discharger which is used as a charger for a copying machine and also can limit the charging ranges to specified imaging ranges, a concept is disclosed, wherein strip-like discharge electrodes are arranged in the longitudinal direction of a photosensitive member through insulation on two or more exciting electrodes splitted transversially to meet copy paper sizes, and further an ac power source is applied between combinations of exciting electrodes, so selected as to meet copy sizes, and said discharge electrodes. In this discharger, however, ac electro static capacity will be varied for each combination, because a circuit to be an ac circuit load is changed over to another for each switching. Since the frequency of a power supply for use in this kind of charger is extremely high, the slightest change in electro static capacity will change the voltage, thus causing a deviation of the resonance point to fluctuate necessary current, resulting in a drawback of the failure to achieve stable charging.

To overcome said drawback and to provide for the reproduction of various widths of copies, a solid state corona discharger for charging photosensitive members on copying machines, which can adjust its charging width to given imaging ranges without any change in the ac circuit constants of the ion generating portion in the solid state corona discharger, can be realized by: In the solid state corona discharger whose principles have been illustrated using FIG. 5, the length of paired ac electrodes is nearly equalized to the whole width of the photosensitive drum (the length in the axial direction): Two or more dc-applied electrodes are provided so as to meet the imaging lengths and ranges (on photosensitive members) which correspond to every copy sizes used in the copying machine: And further, a switch is provided which can connect said dc electrodes to the dc power source selectively in accordance with a copy size to be used.

Figure 3:
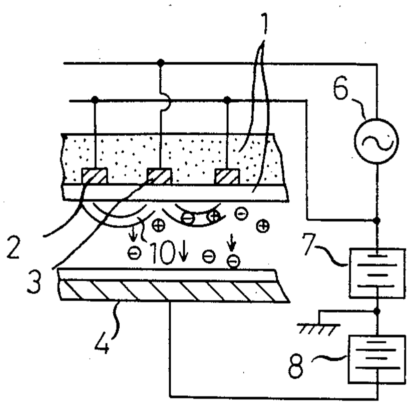
FIG. 3 PRIOR ART
Figure 14:
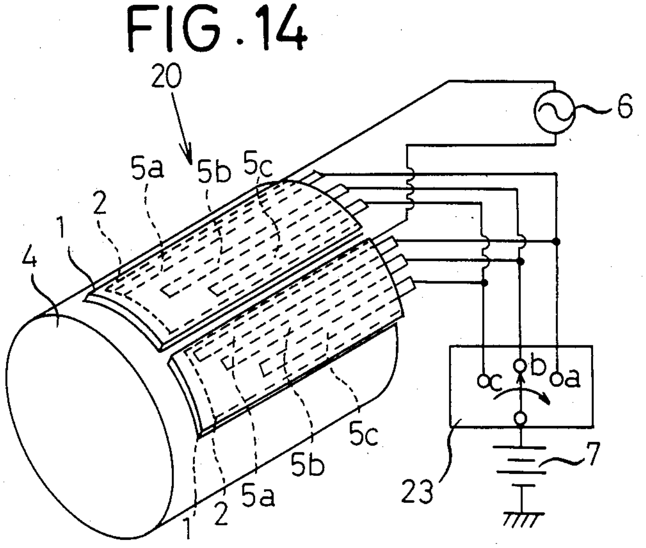
FIG. 14 is a perspective view of an embodiment according to the invention applied to a charger for photosensitive members in a copying machine various sizes of image can be copied.
Figure 15:
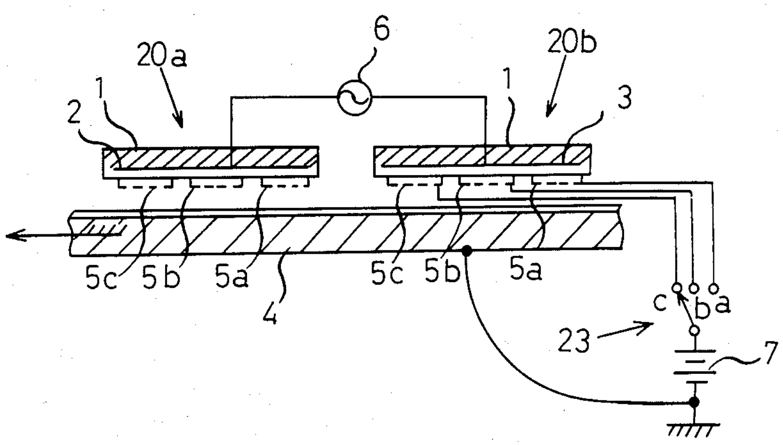
FIG. 15 is a sectional view of the embodiment shown in FIG. 14.

The following is a detailed explanation of an embodiment having said configuration, using FIGS. 14 and 15:

A solid state corona discharger is so splitted longitudinally into two portions 20*a* and 20*b* as to have closer proximity to a photosensitive drum 4, which are respectively provided with either one of ac electrodes 2 and 3, a dielectric 1 surrounding it, and two or more (three in this example) dc-applied electrodes 5*a*, 5*b* and 5*c* each covering a range corresponding to a width range to meet each copy size. Between the ac electrodes is connected an ac power source 6, and the three pairs of dc-applied electrodes, each pair being of the same length, are connected by lead wire in parallel respectively to terminals a, b and c of a changeover switch 23 and thus selectively through a terminal to a dc source 7. The mesh type of dc-applied electrodes as shown in FIG. 3 is used for the electrodes 5*a*, 5*b* and 5*c*.

Such being the configuration of the discharger, when the switch 23 is switched to a dc-applied electrode in accordnce with a given copy size to apply the dc power source 7, as well as when no direct current is conducted, invariable is the electrical capacity of a capacity-basis closed loop starting from the ac power source 6, passing through the ac electrode 2, one dcapplied electrode 5*a*, or 5*b*, or 5*c*, the other electrode 5*a*, or 5*b*, or 5*c*, and the ac electrode 3, and ending up again in the ac power source 6. Therefore, if a charging width of a photosensitive member is changed to another according to another given copy size, the frequency will not change so that stabilized charging can be expected.

Figure 16A:
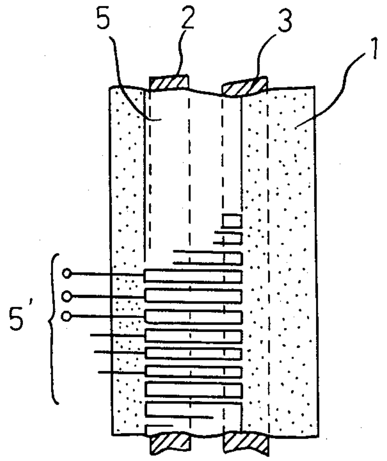
FIG. 16A is a plan view of an embodiment wherein the invention is applied to a latent image forming system for a printer.
Figure 16B:
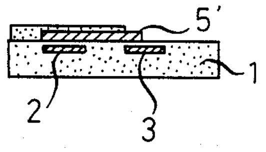
FIG. 16B is a sectional view of the embodiment shown in FIG. 16A.

FIGS. 16A and 16B are sketches showing an embodiment wherein a solid state corona discharger according to the invention is utilized as a latent image generator for printers. In this generator, the third electrode 5, which is shaped as a band shown in FIGS. 4 to 6, is splitted length-wise into a number of pieces 5' as shown in FIG. 16A, which are insulated from each other and arranged on the surface of a dielectric 1 to form a newly assembled third electrode 5. Therefore, applications of pulses according to information signals for each piece 5' provide an electro static latent image of the information directly on a material 1 to be charged.

What is claimed is:

1. A solid state corona discharger for charging a substance on one side thereof comprising:

(a) a pair of thin strip-shaped ac electrodes which are arranged side by side substantially in parallel and spaced apart from each other so as to preclude discharge between them, said ac electrodes being enveloped in and covered by, at least on one side thereof facing a substance to be charged, by a dielectric layer;

(b) an ac power supply for applying an ac potential across said ac electrodes;

(c) a thin dc electrode which is located on said one side of said ac electrodes and in contact with an external surface of said dielectric layer so as to form a closed circuit loop of capacitances with said ac electrodes but not connected therewith in terms of direct current, said dc electrode being placed to face opposite a substance to be charged;

(d) a dc power supply for applying a dc potential between said dc electrode and the substance so as to generate a dc electric field between the solid state corona discharger and the substance, and (e) wherein a corona discharge is also initiated between said ac electrodes and said dc electrode by application of an ac potential across said ac electrodes.

2. The solid state corona discharger as claimed in claim 1 wherein said ac power supply has nearly equal impedances viewed from the respective terminals of said paired ac electrodes.

3. The solid state corona discharger as claimed in claim 1 wherein a contact angle of the edge face of said dc-applied electrode with said dielectric surface is less than 90 degrees.

4. The solid state corona discharger as claimed in claim 1 wherein said dc-applied electrode is constructed with mesh-like or two or more strip-like filaments.

5. The solid state corona discharger as claimed in claim 1 wherein said dielectric layer is so made that the base material is resin and a coating of ceramics is applied at least on the surface where the dc-applied electrode is placed.

6. The solid state corona discharger as claimed in claim 5 wherein the main composition of said resin is epoxy resin.

7. The solid state corona discharger as claimed in claim 5 wherein said resin is of polyimide group or polyamide-imide group.

8. The solid state corona discharger as claimed in claim 5 wherein said ceramics is spattered or chemical vaporization deposited with SiOx- or $Al_2O_3$ -series dielectric material.

9. The solid state corona discharger as claimed in claim 5 wherein said ceramics is spattered or chemical vaporization deposited with $Si_3N_4$ -series dielectric material.

10. The solid state corona discharger as claimed in claim 5 wherein said ceramics is spattered with TaN-series dielectric material.

11. The solid state corona discharger as claimed in claim 1 wherein said ac electrodes, along with the dielectric layer covering them and the dc-applied electrode in contact with the external surface of the layer, are reassembled into two or more slender self-contained pieces, and each dc-applied electrode on the surface layer of each splitted slender piece is connected to each other with lead wire or lead plate and each piece is so placed that its surface is nearly parallel to the surface to be charged.

12. The solid state corona discharger as claimed in claim 12 wherein each said piece is placed side by side at proper intervals.

13. The solid state corona discharger as claimed in claim 1 wherein ventilation holes are provided through said solid state corona discharger between the dielectric surfaces facing and opposite to the surface to be charged.

14. A method of using a solid state corona discharger for charging a substance on one side thereof comprising:

(a) providing a pair of thin strip-shaped ac electrodes which are arranged side by side substantially in parallel and spaced apart from each other so as to preclude discharge between them, said ac electrodes being enveloped in and covered by, at least on one side thereof facing a substance to be charged, by a dielectric layer;

(b) applying an ac potential across said ac electrodes;

(c) providing a thin dc electrode which is located on said one side of said ac electrodes and in contact with an external surface of said dielectric layer so as to form a closed circuit loop of capacitances with said ac electrodes but not connected therewith in terms of direct current, said dc electrode being placed to face opposite a substance to be charged;

(d) applying a dc potential between said dc electrode and the substance so as to generate a dc electric field between the solid state corona discharger and the substance, and (e) initiating a corona discharge between said ac electrodes and said dc electrode by applying the ac potential across said ac electrodes.

15. A method of using a solid state corona discharger as claimed in claim 14 wherein said substance to be charged is the surface of photosensitive member for an electrophotographic copying machine which can reproduce various sizes of copies, and further wherein the length of said paired ac electrodes is nearly equal to the whole width of the photosensitive drum: a plurality of said dcapplied electrodes are provided so as to meet the imaging lengths and ranges (on photosensitive members) which correspond to every copy sizes used in a copying machine: and further, a switch is provided which can connect the dc electrodes to the dc power source selectively in accordance with a copy size to be used.

16. A method of using a solid state corona discharger as claimed in claim 14 wherein said substance to be charged is a latent image bearing surface for a printer on which electro static latent images are formed according to information signals, and further wherein said dc-applied electrode is splitted into a number of pieces insulated from each other, and applications of pulses according to information signals for each piece provides an electro static latent image of the information directly on said material to be charged.

* * * * *